United States Patent [19]

Maier

[11] Patent Number: 4,704,313

[45] Date of Patent: Nov. 3, 1987

[54] MOSAIC BOARD WITH ENCLOSING FRONTAL PANEL

[75] Inventor: Georg Maier, Weisendorf, Fed. Rep. of Germany

[73] Assignee: Siemens Aktiengesellschaft, Berlin and Munich, Fed. Rep. of Germany

[21] Appl. No.: 808,312

[22] Filed: Dec. 12, 1985

[30] Foreign Application Priority Data

Feb. 25, 1985 [DE] Fed. Rep. of Germany ....... 3506582

[51] Int. Cl.$^4$ ............................................. H02B 15/04
[52] U.S. Cl. ....................................... 428/33; 52/284; 428/45; 428/99; 446/116; 446/120; 446/127
[58] Field of Search ................... 52/284, 262; 446/108, 446/127, 116, 120; 428/33, 45, 99

[56] References Cited

U.S. PATENT DOCUMENTS

| | | | |
|---|---|---|---|
| 379,429 | 3/1888 | Werth | 428/33 X |
| 2,151,468 | 3/1939 | Henderson | 52/316 X |
| 2,155,823 | 4/1939 | Hamlin et al. | 52/284 |
| 2,771,110 | 11/1956 | Tuck | 206/575 X |
| 3,020,601 | 2/1962 | Stambaugh et al. | 52/262 |
| 3,125,192 | 3/1964 | Ramseur, Jr. | 52/284 X |
| 3,811,219 | 5/1974 | Fischer | 446/127 X |
| 4,006,713 | 2/1977 | Hawley, III | 52/262 X |
| 4,109,409 | 8/1978 | Fischer | 446/127 |
| 4,182,072 | 1/1980 | Much | 446/115 |
| 4,426,815 | 1/1984 | Brown | 52/284 X |
| 4,431,395 | 2/1984 | Babos | 428/7 X |
| 4,556,594 | 12/1985 | Sedlatschek et al. | 428/83 |

FOREIGN PATENT DOCUMENTS

| | | | |
|---|---|---|---|
| 0040409 | 11/1981 | European Pat. Off. | 428/33 |
| 2904592 | 8/1980 | Fed. Rep. of Germany | 428/45 |

OTHER PUBLICATIONS

Siemens Publication "Mosaic Tiles One System-Two Sizes" Publication No. A19100-E142-B227, Published Aug. 1984.

Primary Examiner—Henry F. Epstein
Attorney, Agent, or Firm—Mark H. Jay

[57] ABSTRACT

A mosaic panel of variable dimensions built up of two interlocking complimentary components. Each component with disconnectable front panel has a side ratio of its frontal configuration of 2:1 and can be divided in its interior by a snap-in partition wall into two equal-size compartments having a square frontal configuration. Each component is combined with correspondingly sized square components. Thus, rectangular active components as well as square active components can be inserted in the mosaic panel and arranged in components.

1 Claim, 8 Drawing Figures

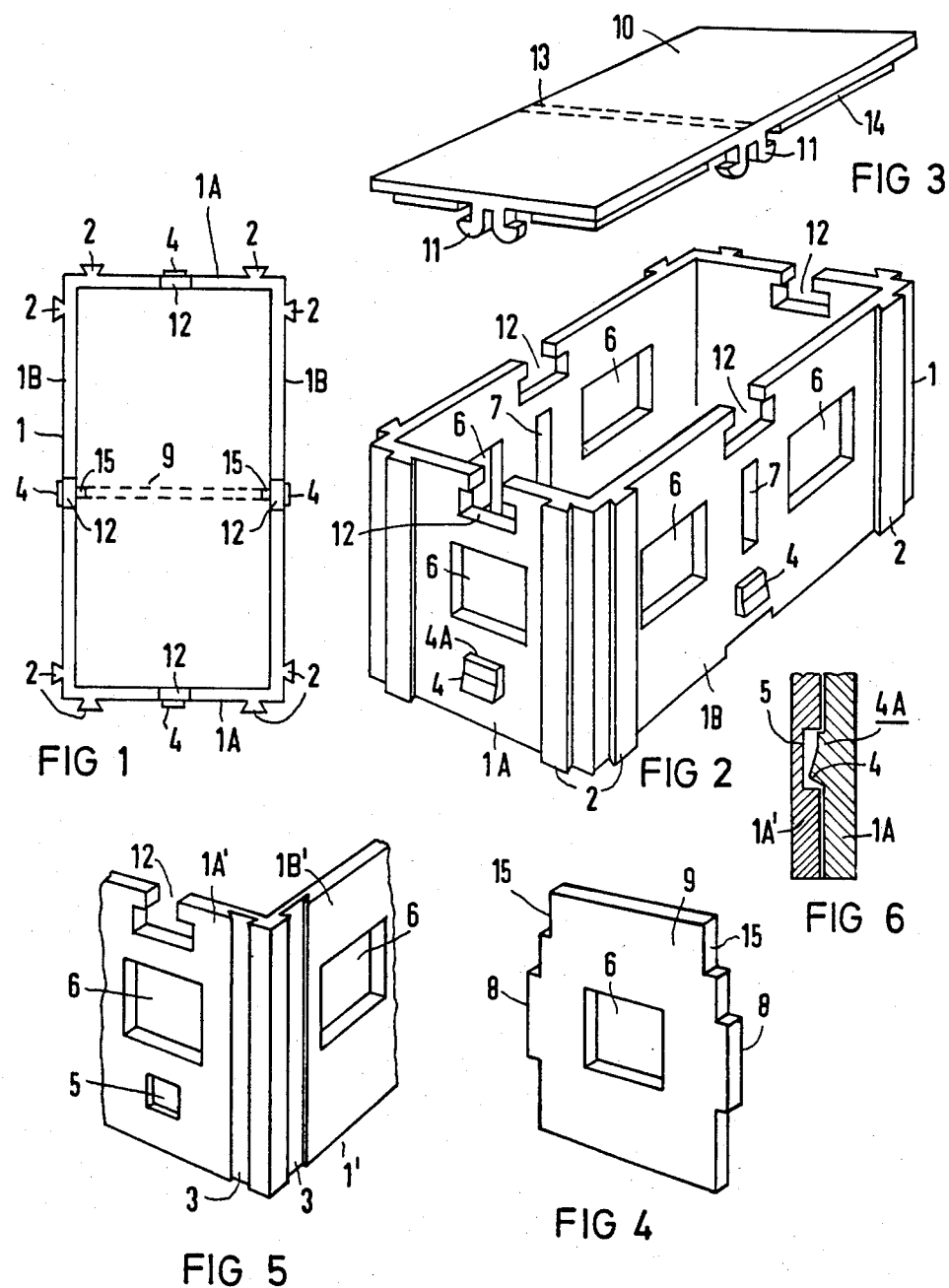

MOSAIC BOARD WITH ENCLOSING FRONTAL PANEL

BACKGROUND OF THE INVENTION

The invention relates to control boards and more particularly to ones with a closed frontal panel constructed out of a mosaic of right rectangular parallelepiped components each having an enclosing front panel.

The use of mosaic boards is known from a Siemens publication titled "Mosaic Technology, One System—Two Sizes," order no. A19100-E142-B227 (114 544 WS 8842), published August, 1984. A mosaic board consisting of components whose individual square frontal panels can be removed according to this publication, comprises: primarily inert components without any surface symbols, among them also dummy components with purely visual and unchanging symbols to model and represent any desired distribution arrangements, and active components with variable display and/or actuating mechanisms. Given adequately small-sized display and/or actuating mechanisms, said active components can be inserted into the individual inert components upon removal of the frontal panel and positioned therein in a detachable fashion.

In plant control engineering according to "Siemens catalogue" W13, 1984, it is a known procedure that so-called standard fields are to be fastened with a front side aspect ration of 2:1 along evenly spaced parallel mounting rails (compact grid). These standard fields have locations for light compartments and/or pushbuttons, and a cover plate with indicator windows as well as cutouts for projecting actuating mechanisms. On the reverse side of the locations there are connector contacts for up to three plugs.

To install larger devices or instruments in such compact grids, snap-in plates can be inserted from the frontal side along with the device or instrument involved, or screw-on plates can be inserted from the rear side. The inert fields which are not fitted with display and/or actuating mechanisms or instruments, are designed in a flat pattern with an aspect ratio of 2:1 and also held exclusively by the compact grid of mounting rails.

It is the object of this invention to provide mosaic boards out of individual components without any mounting rails, which comprise disconnectable components for plant control engineering and in general mosaic boards which will require fewer overall components to build a specified board surface. It is a further object of this invention to provide an optional easily disconnectable mounting arrangement permitting the insertion of active components of various sizes as well as the insertion of devices of varying shapes in openings created by the omission or removal of at least one component.

SUMMARY OF THE INVENTION

Briefly stated in accordance with one aspect of the invention, the aforementioned objects are achieved by providing a mosaic board, with an enclosing front side constructed from a plurality of a first type of right rectangular parallelepiped components connecting alternatingly to a plurality of a second type of right rectangular parallelepiped components without support rails. Each of the components has a disconnectable front panel which is open to the rear of the component. The first type of components each have on each of the four sides of the parallelepiped two, dovetailed mounting projections. The second type of components each have in each of the four sides of the parallelepiped two dovetailed grooves located to interconnect with the mounting projections. Each of the components also has a plurality of front cutouts formed in each of the four sides each said front cutout forming a mounting edge parallel to said front panel for securing a spring held special component and a molded-on locking mechanism which can be mutually disconnected but prevent any shifting of position. The mosaic board characterized by having a longer side of each rectangular component and each front cover has an aspect ratio of 2:1 with respect to a shorter side of each retangular component and each front cover. Each front cover has connected to it disconnectable spring clips for disconnectably attaching to the front cutouts and said position edges parallel to said front panel when attached, A first pair of large cutouts are located each with a mounting edge symmetrically between the two dovetailed projections on each longer side of the first type of components. A second pair of large cutouts each with a mounting edge are located symmetrically between the two dovetailed grooves on each longer side of each said second type of components. An access opening is located midway between each said pair of cutouts for receiving a mounting projection of a space dividing partitioning wall and disconnectably locking said partitioning wall into position. A large cutout with a positioning edge similar to the first and second pairs of cutouts is located in the partitioning wall providing, when the partitioning wall is in position, a volume in which to locate an insertible component having a square shape.

Therein the main portion of the board surface can be formed of approximately half the number of rectangular components of twice the size, into which when desired side walls and known square components can be inserted. On the inside of the rectangular components not only active components with suitable rectangular frontal shapes, but also up to two active components with square frontal shapes can be fitted to lock-in in a disconnectable fashion. It is also possible to insert larger rectangular or square instruments or devices into an opening created by removal of at least one rectangular component and to mount them in an either directly or indirectly locking fashion.

In order to obtain a uniform visual impression given said combination of rectangular and square components, the enclosing front panel can contain a middle groove, which gives the impression of defining two squares so that the impression of having a mosaic board comprising only square components is created.

In another aspect of the invention, the mounting of instruments or devices in the openings can be handled by angular components with a level front surface, wherein the level front surface is connected on its one edge only to a fastening panel set at a right angle so that it can be easily fitted to projecting equipment parts. Said angular components can also be used as unfitted covers for openings which are not wider than two square components.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

FIG. 1 shows an embodiment of a component with mounting devices (component of the first type) in a plan view without frontal panel.

FIG. 2 illustrates the object shown in FIG. 1 in a perspective view.

FIG. 3 shows a fitting front panel in perspective.

FIG. 4 shows a partition wall in perspective as shown by the broken lines in FIG. 1;

FIG. 5 illustrates a partial perspective view of a component embodiment with mounting grooves (component of the second type).

FIG. 6 shows a partial cross-sectional view detailing the interlocking of two components of the second type.

DESCRIPTION OF A PREFERRED EMBODIMENT

Figure 8:
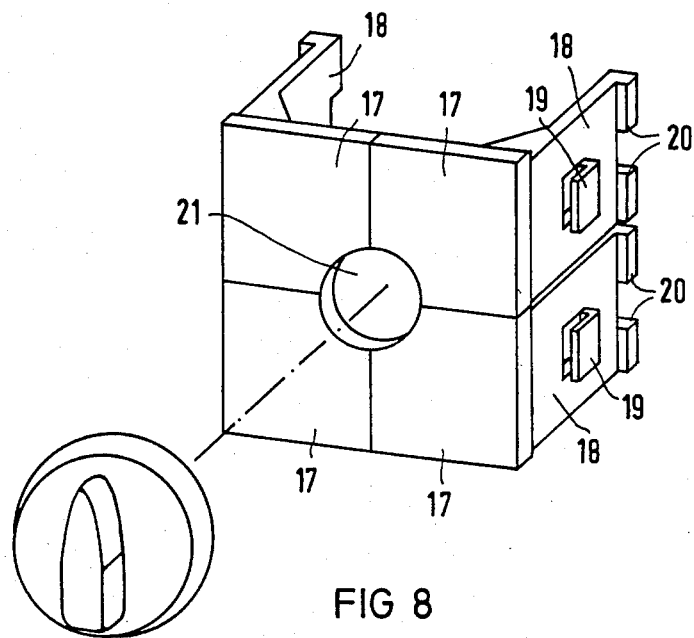
FIG. 8 illustrates an angular component group.

Component 1 according to FIGS. 1, 2 and 5 is made of plastic and is designed as a right rectangular parallelepiped shape having narrower side panels 1A as well as longer side panels 1B, whose front shape has an aspect ratio of 2:1. Each side panel 1A, 1B has on its outer sides two edge-parallel undercut or "dovetailed" mounting projections 2 or in components 1' as shown in FIG. 5 corresponding mounting grooves 3 at side panels 1A', 1B' for said projection. In addition, there is a locking projection 4 symmetrically arranged between the two positioning projections 2 at each exterior side of side panels 1A, 1B, respectively, and at side panel 1A', 1B', respectively, a corresponding locking recess 5 beneath a respective symmetrically arranged cutout 6 with mounting edges in the side panels 1A, or 1B', or two such cutouts 6 on side panels 1B or 1B'. To permit the removal of components 1 (FIG. 2) to the front side of the mosaic board and a removal of components 1' (FIG. 5) to the rear side using components which can be easily fabricated and in which the mounting projections 2 or mounting grooves 3 extend over the entire length, and in order to ensure their fixation in their operating position, the locking projection 4 can be chamferred at its lower edge in order to mate with locking recess 5 in accordance with FIG. 6, while having at its upper edge a supporting surface 4A which, projecting at a right angle to side panel 1A, prevents any shift since it locks into the facing surface in the side panel 1A'.

Mating openings 7 for projections 8 on the side edges of a partition panel 9 (FIG. 4) are arranged along the center line of the longer side panels 1B or 1B'. Partition panel 9 can be fastened by being snapped into the interior sides of side panels 1B, 1B', fitting tightly with its projections 8 in mating opening 7, and—when required—it divides the rectangular interior of component 1, or 1' into two compartments with a square frontal configuration. If neither a front closing, not shown, large active component nor two correspondingly smaller active components are locked into the component, component 1, or 1' is closed by an enclosing front panel 10 snap-locked in place as per FIG. 3. For that purpose snapping links 11 are formed to project along the underside of front panel 10, which lock into the undercut edge cutouts 12 at the upper edges of components 1, or 1'. In some embodiments, front panel 10 can be divided visually into two squares by a middle groove 13.

The not-depicted, active components locked in place in the normal fashion in the interior compartments or compartments, can be equipped with molded-on rectangular or square frontal surfaces or project beyond the front panel 10, with their setting or operating units to not shown cutouts. For positioning of the front panel 10 on component 1, or 1' in a fashion that prevents shifting, a frame 14 can be molded-on along the panel's underside, offset from the edge to the inside. The height of partition wall 9 reaches the upper edge of component 1, and 1' and can be set back to form an interspatial volume 15 between the inner sides of side panels 1B, or 1B' and the side edges at the upper section.

Figure 7:
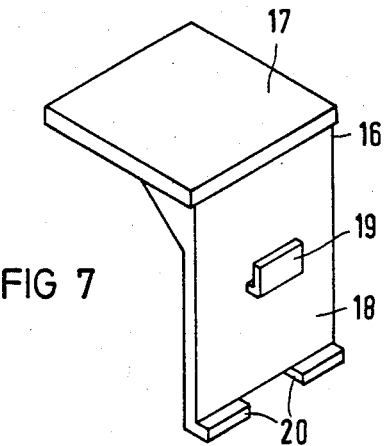
FIG. 7 illustrates in perspective an angular component.

The gap formed by removing at least one component 1, or 1' or at least one not shown square component, can be closed by a corresponding number of angular components 16 which can be inserted as per FIG. 7. Said angular components 16 can be fitted subsequently in an easy fashion along the front surfaces 17 with suitable cutouts 21 (FIG. 8) through which, for example, actuating shafts for rearside mounting of switching units can be conducted, with the switching units or similar units being mounted in a disconnectable fashion, e.g., by locking spring latches of holding devices which penetrate cutouts 6 of the components, or in some other known fashion.

FIG. 8 shows four angular components 16 with their partial cutouts each designed at one corner, which together form cutout 21, which components are to be inserted in place of two missing components 1, or 1' or four square components. The fastening angles 19 mounted on fastening panel 18 are slid through corresponding cutouts 6, and the projections 20 at the lower edge facing away from frontal surface 17 are locked in a spring-action arrangement with the lower edges of components 1, or 1'.

For the upper-end support and fastening of the opening or openings of the larger devices or instruments of rectangular or square shapes, which fill the openings of the mosaic board, a supporting frame each can be designed in an otherwise not shown fashion to serve as a supporting unit which surrounds the front sides of the devices or instruments and is supported by the front edges of the adjoining components or their front panels. The devices or instruments can be connected on the rear side to mounting units having spring latches which lock into cutouts 6. Other known arrangements for positioning said devices or instruments can also be employed.

It will now be understood that there has been disclosed an improved mosaic board for constructing control panels out of two type of rectangular components without a grid of supports. As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and script of the invention.

What is claimed as new and desired to be secured by Letters Patent of the United States is:

1. A component system for constructing control panels of the mosaic type in which elements having two different front shapes can be inserted to form a flush panel surface, in which all elements are open rearwardly and in which empty components can be capped by a detachable front panel comprising:

a rectangular open-faced frame having two like parallel long sides and two like parallel short sides, the long sides being twice as long as the short sides, the long sides having a centrally located seating aparture, the seating apartures being so located that when a partition is inserted therein, the frame is divided into two generally cubical volumes, each of the long sides having two like openings and each of the short sides having a single opening for receiving an element inserted into the frame;

a partition shaped to snap-fit into said seating apartures and having a like opening for receiving an element inserted into one of the generally cubical volumes of the frame; and a front panel which is detachably securable to a face of the frame and which has a rearwardly extending ledge that abuts the sides of the frame when the front panel is secured thereto.

* * * * *